J. HÄRDÉN.
ELECTRODE.
APPLICATION FILED APR. 27, 1905.
1,024,257.
Patented Apr. 23, 1912.
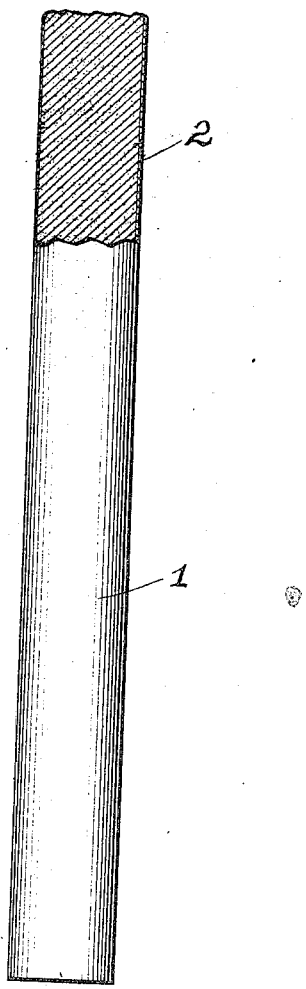
Witnesses:
John E. Hubbell
Helen Oxford
Inventor:
Johannes Härdén,
by Albert G. Davis
Att'y.

UNITED STATES PATENT OFFICE.

JOHANNES HÄRDÉN, OF SCHENECTADY, NEW YORK, ASSIGNOR TO GENERAL ELECTRIC COMPANY, A CORPORATION OF NEW YORK.

ELECTRODE.

1,024,257.

Specification of Letters Patent. Patented Apr. 23, 1912.

Application filed April 27, 1905. Serial No. 257,580.

*To all whom it may concern:*

Be it known that I, JOHANNES HÄRDÉN, a subject of the King of Norway and Sweden, residing at Schenectady, county of Schenectady, State of New York, have invented certain new and useful Improvements in Electrodes, of which the following is a specification.

My present invention relates to the composition of arc light electrodes and more particularly to the composition of electrodes of the character which yield so called flaming or luminous arcs.

My present invention consists of an electrode, one of the principal constituents of which is the substance boron. The boron may be employed in electrodes varying in composition and the manner of their production. I have obtained excellent results in the following manner: A mixture containing approximately two parts of boron anhydrid in the form of a coarse powder and one part of aluminum in the form of small lumps or pieces is first heated slowly in a suitable crucible such as a Hessian crucible in which the expansion of the mass can take place without danger to the crucible. After the initial heating at comparatively low temperature the mixture is placed in a refractory crucible not attacked by boron, such as a crucible formed of magnesia which may in turn be placed in a graphite crucible and is heated for a short time at a high temperature, say that of 2300 degrees centigrade. After this heating the mass is allowed to cool slowly. The heating of the mass and its subsequent cooling in the manner described results in the crystallization into needle crystals of the boron in whatever form it may be. I have found that the form of crystallization is important, as much less satisfactory results are obtained when the boron is not crystallized as described.

After the crystallized material is cooled it is treated with acid to dissolve the free aluminum, and then treated with alkali to remove the acid residue, after which it is washed in water. The aluminum oxid is separated out in any suitable manner. The crystallized boron is then powdered and mixed with carbon, and heated in a carbon crucible in an electric furnace. This converts the boron into a compound which I believe to be boron carbid, probably having the composition $B_6C$. The material thus formed is mixed with carbon and titanium carbid to form a mixture from which electrodes are made. The proportions of carbon, titanium carbid, and boron compound employed may vary somewhat. In one form of my invention I use a mixture containing substantially 60 parts of titanium carbid, 20 parts of the boron compound, and 20 parts of carbon. In a second form I employ substantially 40 parts of titanium carbid, 40 parts of the boron compound and 20 parts of carbon. In a third form I employ substantially 20 parts of titanium carbid, 60 parts of the boron compound, and 20 parts of carbon. The first form of electrode is consumed with comparative slowness by the arc and gives an efficient amount of light of a good color. The second form gives slightly less light than the first, but the arc obtained is more steady. The third form gives a steady fat arc. This form of electrode is consumed more rapidly however than either of the first two, and the light obtained has a greenish tinge.

In forming electrodes from any of the mixtures described above, the mixture is first powdered and then moistened and mixed with a suitable binder such as tar. Electrodes are then molded or squirted from the mixture in the usual manner. The formed electrodes are first slowly dried to remove the water contained by them and are then hardened by baking in a suitable furnace such as a carbon tube electric furnace. After the electrode is hardened by baking it is copper-plated to prevent oxidation under the conditions of service. The conductivity of the electrode thus formed is good.

Any of the electrodes described above possess excellent light-giving properties and can be advantageously used both in alternate and direct current lamps. When used in direct current lamps, the electrode containing boron may advantageously be employed as a negative electrode in conjunction with a positive nonconsuming electrode. In an alternate current lamp two similar electrodes of the character described above may be employed as the arching terminals of the lamp, or one such electrode may be used in conjunction with a carbon electrode.

In the accompanying drawings I have shown in elevation and partly in section an electrode such as may be made in the manner hereinbefore described.

1 represents the body of the electrode containing boron as described and 2 represents the coating of copper which may be electroplated thereon.

While I have hereinbefore disclosed the best forms of my invention now known to me, it will be obvious that changes may be made in the composition and manner of production of the electrodes described without departing from the spirit of my invention, and I do not wish the claims hereinafter made to be limited to the particular compositions and the methods of producing electrodes set forth, more than is made necessary by the state of the art.

What I claim as new and desire to secure by Letters Patent of the United States, is:

1. A composite arc-light electrode containing carbid of boron.
2. A composite arc-light electrode containing a preponderating amount of carbid of boron.
3. A composite arc-light electrode composed of carbon, carbid of titanium and carbid of boron.
4. A composite arc-light electrode containing carbon and carbid of boron.
5. A composite arc-light electrode containing carbid of titanium and carbid of boron.

In witness whereof, I have hereunto set my hand this 25th day of April, 1905.

JOHANNES HÄRDÉN.

Witnesses:
BENJAMIN B. HULL,
HELEN ORFORD.